United States Patent
Holtz, Jr. et al.

[15] 3,660,110
[45] May 2, 1972

[54] METHOD FOR PRODUCING AN IMPROVED PUFFED CEREAL

[72] Inventors: William E. Holtz, Jr., Chicago; Robert R. Reinhart, Des Plaines, both of Ill.

[73] Assignee: The Quaker Oats Company, Chicago, Ill.

[22] Filed: Sept. 15, 1969

[21] Appl. No.: 858,100

[52] U.S. Cl. ................................................99/81
[51] Int. Cl. ...............................................A23l 1/18
[58] Field of Search ...............................99/82, 81

[56] References Cited

UNITED STATES PATENTS

| | | |
|---|---|---|
| 2,698,799 | 1/1955 | Rupp et al. ..................99/82 |
| 2,766,120 | 10/1956 | Reinhart ......................99/82 |
| 2,954,295 | 9/1960 | Clausi et al. .................99/82 |
| 2,292,274 | 8/1942 | Kellogg ........................99/82 |
| 2,295,116 | 9/1942 | Kellogg ........................99/82 |

*Primary Examiner*—Raymond N. Jones
*Attorney*—Milton C. Hansen and Donnie Rudd

[57] ABSTRACT

A process for improving whole grain puffed cereal products by reducing the moisture content of the whole grain puffed cereal product to a level of from 0.5 to 1.5 percent by weight based on the weight of the puffed whole grain and then allowing the moisture content to rise to packaging levels.

10 Claims, No Drawings

METHOD FOR PRODUCING AN IMPROVED PUFFED CEREAL

BACKGROUND OF THE INVENTION

1. Field of the Invention

This invention relates to a process for producing an improved whole grain puffed cereal product. In particular this invention relates to a method for improving the well known puffed wheat and puffed rice cereal products.

2. Description of the Prior Art

Whole grain puffed cereal products such as puffed wheat and puffed rice have been marketed for many years. The most recent advances in production of these products are the processes such as are described in U.S. Pat. Nos. 2,698,799 and 2,766,120. The invention described herein is an improvement of the products as described in these patents.

SUMMARY OF THE INVENTION

It is an object of this invention to provide a process for producing an improved whole grain puffed cereal product.

It is another object of this invention to provide a process for producing whole grain puffed cereal products having extended bowl life.

It it still another object of this invention to provide an improved whole grain puffed cereal product.

The objects of this invention are achieved by a post puffing heat treatment step wherein whole grain puffed cereal products such as puffed wheat and puffed rice are heat treated to reduce the moisture content thereof to a level of from about 0.5 to about 1.5 percent by weight based on the weight of the puffed grain.

The puffed whole grain products which are improved by this invention are prepared by conventionally known processes including those described in U.S. Pat. Nos. 2,698,799 and 2,766,120. Briefly this process consists of quickly heating whole cereal grains such as wheat or rice, without substantial cooling, and thereafter introducing the heated grain into a preheated puffing chamber. The chamber is sealed, steam is injected into the gun to build up the pressure therein and the pressure is then maintained for a definite period after which the closure of the chamber is suddenly released causing the grains to puff. One important feature of this process is that the cereal grains while being agitated are rapidly preheated to a temperature of above 212° F. and preferably within the range of from 240° to 320° F. by a gas stream such as a current of air heated to a temperature within the range of from 350° – 1,200° F., and preferably within the range of about 850° F. to about 1,000° F., for a period of from about 15 seconds to about 60 seconds. Since the grain is heated to a desired temperature very quickly there is only a small reduction in the moisture content of the grain. After the cereal grains have been so heated they are immediately introduced into a puffing chamber which has been preheated and under conditions such that the heated grains prior to the puffing operation are not allowed to cool much below the temperature attained in the preheating chamber. The typical utilization of this process results in the moisture content of wheat being reduced from a normal prepuffing moisture of about 10–12 percent to a post puffing moisture of about 3–4 percent by weight. In the case of rice the moisture content is typically reduced from a normal prepuffing moisture of about 12–14 percent to post puffing moisture of about 3–4 percent by weight.

While the above described conventional process has resulted in a good tasting and highly acceptable puffed product, our present invention has still provided a significant improvement in the product. While conventional puffed whole grain products such as puffed wheat and puffed rice have been found to be acceptable to the consumer, these products have still been somewhat lacking in what may be called bowl life characteristics. The bowl life characteristic of a puffed product may be said to be the ability of the puffed product to resist becoming a soggy mass. The more milk that is absorbed by these products, i.e. the soggier the products become, the more they lose their customer appeal. While previously known products have a good bowl life for a short period of time, any moderately long exposure to milk in the bowl greatly reduces this characteristic. Our invention has provided a product with tremendously increased bowl life properties which greatly increase its desire over all known products.

Briefly described, our invention consists of a heat treatment step wherein puffed grains are heat treated to reduce the moisture content thereof to a level of from about 0.5 percent to about 1.0 percent by weight based on the weight of the puffed grain. After the moisture content has been held at this level for a sufficient time period the moisture may then be allowed to increase to the normal packaging moisture level of around 3 to 4 percent.

It is not known what the exact chemistry of our heat treatment step is or why the mere reduction of moisture content for a sufficient period of time greatly increases the bowl life of the product. It is known, however, that the product produced herein is significantly better than any product produced by prior methods.

Since it is not within the scope of known technology to ascertain the exact chemical change within the grain wherein our process has acted to give a greatly improved product, we must resort to defining the product that we are herein claiming as the product produced by the new and unique process we have developed. We therefore intend to claim both the product and process for making the product.

The reduction in moisture as provided by this invention has not heretofore been shown. While certain expanded products made from dough and the like have been heat treated to substantially reduce the moisture content thereof without extending the bowl life, it has never been shown that whole grain products such as puffed wheat and puffed rice have been subjected to a post puffing heat treatment step to significantly improve the texture thereof. The uniqueness and criticality of using a whole grain is made more apparent when it is considered that a like treatment of a non whole grain product, i.e. one using a dough base, does not extend appreciably the bowl life of that product. This invention therefore is strictly limited to whole grain puffed products wherein the whole cereal grain is puffed without first being made into a dough or first being fractionated and the different fractions thereafter being puffed.

Another distinct advantage of our process is that once the heat treatment step has achieved a bowl life extension, the bowl life extension is not lost by an increase in moisture prior to packaging. The product can thus be allowed to achieve a normal moisture content of about 3 to 4 percent at the time of packaging and still possess the new and significant bowl life improvement.

While the more well known whole grain puffed cereal products are puffed wheat and puffed rice, we do not intend to limit our invention to these grains. Also included in our invention are other cereal grains which have been advanced to the consumer public such as oats, corn, rye and barley.

While the products of this invention are typically produced by a multiple type gun of the general character disclosed in U.S. Pat. No. 2,414,185, this invention is not to be limited in its use to products produced by guns of this particular type since the broad invention finds application for use in many types of puffing guns. While a particular method for producing the whole grain cereal products has been described in the two referred to patents, any process may be used which will provide a puffed cereal product of the type produced by the herein defined process.

Briefly defined, our invention comprises an improvement for a process for puffing moisture containing whole cereal grains wherein said process comprises feeding said grains into a confined space accessible to the traversing flow of a heated gas therethrough, agitating said grains therein while passing a stream of hot air introduced at a temperature of about 350° F. to about 1,200° F. through said confined space until said grains have reached a temperature range of from about 240° F. to about 320° F., and introducing said grains while still within said temperature range into a puffing gun and then explosively puffing said grains by discharge from said gun. Our invention lies in the improvement of the above described process wherein said improvement comprises heat treating the puffed cereal grains after they have been discharged from the gun to reduce the moisture content thereof to a level of from about 0.5 to about 1.5 percent by weight based on the weight of the puffed grain.

In a preferred embodiment of this invention the moisture content of the puffed grain is reduced to a level of from about 0.5 percent to about 1.0 percent by weight based on the weight of the puffed grain.

It is preferred that the moisture reduction step of our invention be accomplished by exposing the puffed whole grain cereal to heated air for a period of time sufficient to reduce the moisture content to the desired level. Generally, this includes exposure to from about 250°F. to about 400° F. air for from 1 to 6 minutes. In the case of puffed rice, we would prefer to have exposure to from about 280° F. to about 320° F. air for from 4 to 6 minutes. In the case of puffed wheat, we prefer to have exposure to from about 260° F. to about 300° F. air from 1 to 3 minutes. It is to be understood, however, that while the above are preferred moisture reduction conditions, other drying procedures may be used as long as the same end result is accomplished.

DESCRIPTION OF THE PREFERRED EMBODIMENT

Our invention may be more fully described by the following embodiments and examples:

EXAMPLE 1

Whole grains of rice were heated to a temperature of 290° F. by passing them in a current of air heated to a temperature of 1,000° F. for 40 seconds. Without substantial cooling, the heated rice was introduced into a preheated puffing chamber. The chamber was sealed. After sealing, the pressure in the chamber was allowed to reach about 160 p.s.i.g. in a period of 2 minutes and 40 seconds, then for the next 4 seconds the chamber was opened slightly allowing steam to escape and the pressure to drop to about 140 p.s.i.g. The chamber was then resealed and steam was injected causing the pressure to increase over a period of 4 seconds to about 150 p.s.i.g. The closure on the chamber was then quickly released causing the rice to expand or puff. A more complete definition of this process and the apparatus used therein may be found in U. S. Pat. No. 2,766,120. This example does not constitute an embodiment of our invention and is used only for purposes of comparison. Hereinafter, the product produced by this example will be referred to as "control rice."

EXAMPLE 2

Example 1 was repeated except wheat was used instead of rice. Again, this example does not constitute an embodiment of our invention and is used only for purposes of comparison. Hereinafter, the product produced by this example will be referred to as "control wheat."

EXAMPLE 3

A sample of the "control rice" from Example 1 was placed in an oven and exposed to 300° F. air for about 5 minutes until the moisture content of the puffed rice was reduced to about 0.8% by weight of the puffed rice. This heat-treated puffed rice was then compared with a sample of the control rice of Example 1. In comparing the samples, each were placed in a cereal bowl and milk was added thereto the same as a consumer would prepare the product for consumption at breakfast. The samples were compared at ½, 1, 2, 3, 4 and 5 minutes to see if a difference in crispiness and texture were found. In each case, the heat treated product of this example was found to be significantly more crisp than the control rice.

EXAMPLE 4

A sample of the control wheat from Example 2 was heat treated by placing it in an oven and exposing it to 280° F. air for about 2 minutes until the moisture was reduced to about 1.2 percent by weight of the puffed wheat. This product was then compared to a sample of control wheat by placing each in a bowl and comparing the crispiness and texture of each at ½, 1, 2, 3, 4 and 5 minutes. In each case, the heat treated product of this example was found to be significantly more crisp than the control wheat.

Having herein shown a new and unique improvement in producing whole grain puffed cereal products, we claim:

1. In a process for explosively puffing moisture-containing whole cereal grains wherein said process comprises feeding said grains into a confined space accessible to the traversing flow of a hot gas therethrough, agitating said grains therein while passing a stream of hot air introduced at a temperature of about 350° F. to about 1,200° F. through said confined space until said grains have reached a temperature range of from about 240° F. to about 320° F., and introducing said grains while still within said temperature range into a puffing gun and then explosively puffing said grains by discharge from said gun, the improvement comprising heat-treating the puffed grains to reduce the moisture content thereof to a level of from about 0.5 percent to about 1.5 percent by weight based on the weight of the puffed grain and then allowing the moisture content to increase to normal packaging moisture levels.

2. A process as in claim 1 wherein the moisture content of the puffed grain is reduced to a level of from about 0.5 to 1.0 percent by weight based on the weight of the puffed grain.

3. A process as in claim 1 wherein the grain is rice.
4. A process as in claim 2 wherein the grain is rice.
5. A process as in claim 1 wherein the grain is wheat.
6. A process as in claim 2 wherein the grain is wheat.
7. A process for preparing a whole grain, moisture-containing, puffed cereal product comprising puffing the whole grain and then reducing the moisture content of the puffed whole grain to a level of from 0.5 percent to about 1.5 percent by weight based on the weight of the puffed grain and then allowing the moisture content to increase to normal packaging moisture levels.

8. A product prepared by the process as described in claim 1.

9. A process as in claim 1 wherein the normal packaging moisture level is from about 3 percent to about 4 percent by weight moisture.

10. A process as in claim 7 wherein the normal packaging moisture level is about 3 percent to about 4 percent by weight moisture.

* * * * *